United States Patent [19]

Baer et al.

[11] 4,108,233
[45] Aug. 22, 1978

[54] TIRE AND CENTER SUPPORT ASSEMBLING APPARATUS

[75] Inventors: Terry G. Baer, Edelstein; Wayne A. Klopfenstein, Princeville, both of Ill.

[73] Assignee: Caterpillar Tractor Co., Peoria, Ill.

[21] Appl. No.: 782,670

[22] Filed: Mar. 30, 1977

[51] Int. Cl.² .................................... B60C 25/06
[52] U.S. Cl. ..................................... 157/1.37
[58] Field of Search ............... 29/159.01, 159.1, 252, 29/450; 152/405; 157/1, 1.35, 1.37, 1.42, 1.44–1.47; 301/16, 100

[56] References Cited

U.S. PATENT DOCUMENTS

| 1,451,344 | 4/1923 | Robinett | 157/1.41 X |
|---|---|---|---|
| 1,575,869 | 3/1926 | Schmidt | 157/1.41 X |
| 1,792,667 | 2/1931 | Weaver et al. | 157/1.42 |
| 2,228,086 | 1/1941 | Rodgers | 29/252 X |
| 2,353,187 | 7/1944 | Rerick et al. | 29/252 |
| 2,373,975 | 4/1945 | Plumeau et al. | 29/252 X |
| 3,998,258 | 12/1976 | Grawey et al. | 152/405 |

*Primary Examiner*—James L. Jones, Jr.
*Assistant Examiner*—James G. Smith
*Attorney, Agent, or Firm*—Charles E. Lanchantin, Jr.

[57] ABSTRACT

A tire and center support assembling apparatus has a tire supporting frame, a powered actuator having a movable element, and a shoe assembly connected to the movable element and being of a construction sufficient for moving a plurality of shoes into engagement with a split rim to expand it into a preselected interference fit position within a tire.

7 Claims, 8 Drawing Figures

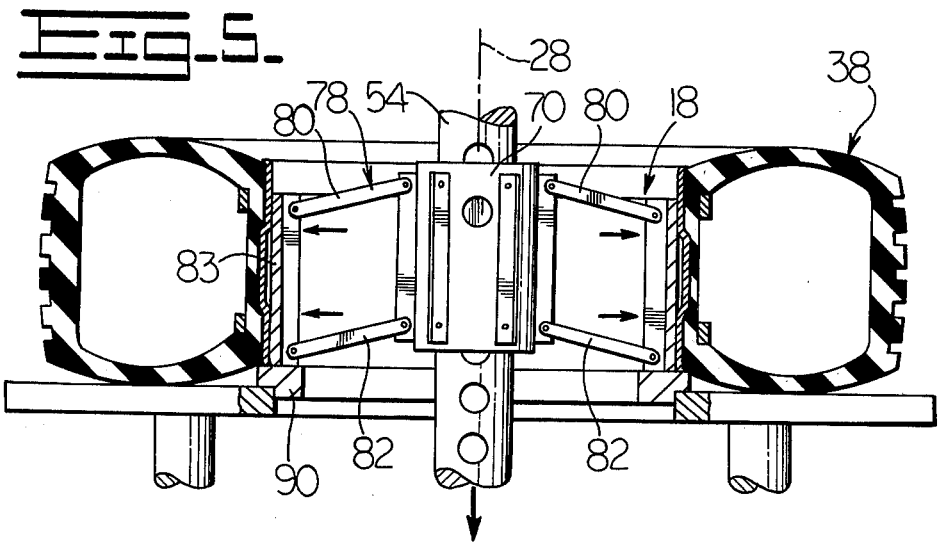
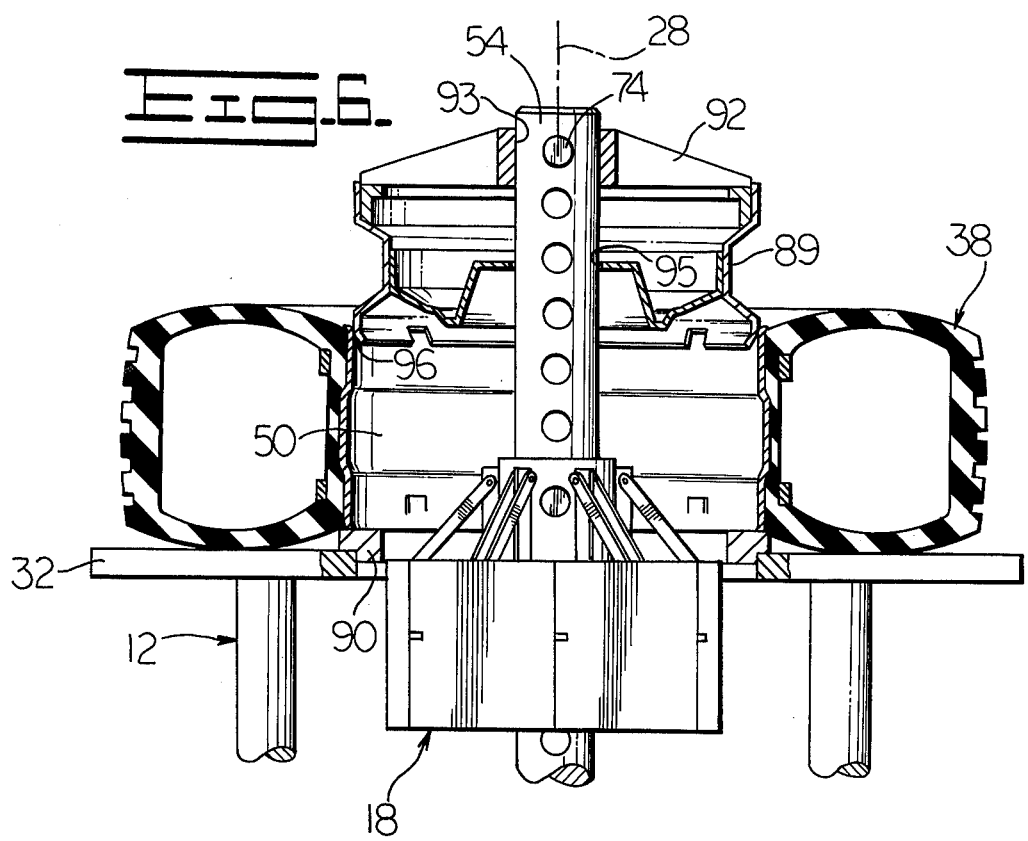

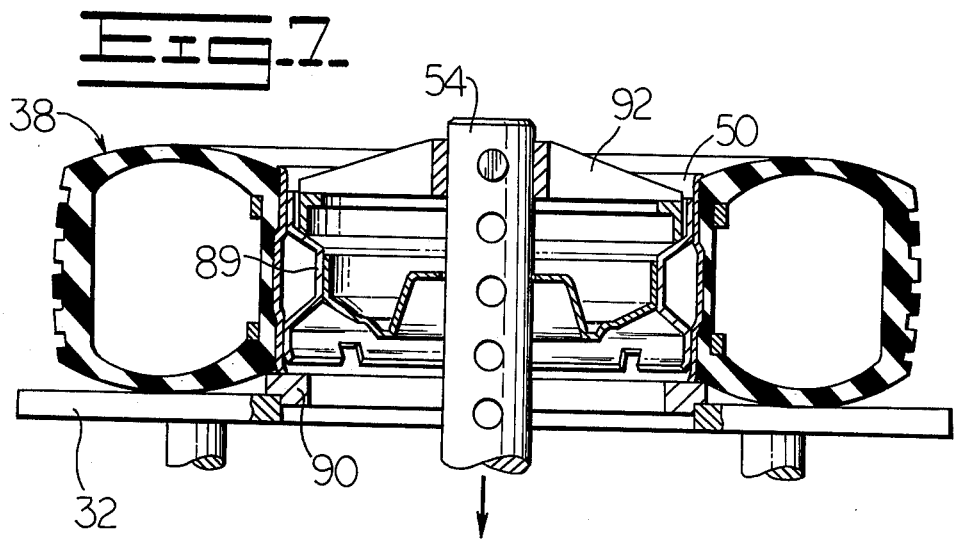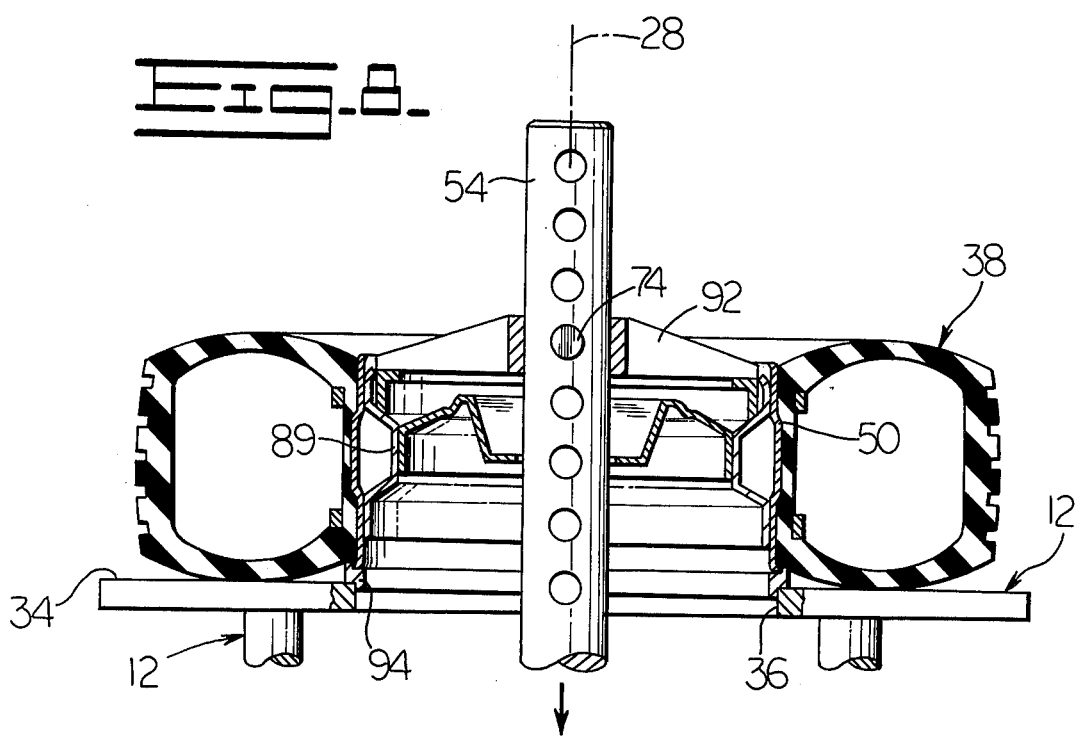

TIRE AND CENTER SUPPORT ASSEMBLING APPARATUS

BACKGROUND OF THE INVENTION

The present invention is related to a powered apparatus and method for more efficiently installing a center support structure into a tire.

Heretofore, considerable hand work and complex fixturing has been required to install a center support structure into a tire. For example, radial expansion of a split rim into the inside diameter of a tire has been accomplished by using oil pressure to fill a rubber bladder arrangement secured to the outer periphery of a metal ring. This was a slow and vexatious procedure, and difficulties were experienced with release of the oil from within the bladder arrangement and removal thereof after the split rim had been expanded to the desired diameter. Furthermore, these prior procedures involved a substantial expenditure of manual effort in order to precisely center and position the tire and various fixtures, including those fixtures required to subsequently install and press the wheel mounting element axially into the split rim, and also those fixtures required to disassemble the components of the wheel after it had been operated in the field.

SUMMARY OF THE INVENTION

The present invention is directed to overcoming one or more of the problems as set forth above.

Accordingly, the present invention provides a novel tire and center support assembling apparatus and method for using the same, with the apparatus including a tire supporting frame, a powered actuator having a movable element, and a shoe assembly having a plurality of shoes connected to the movable element and being of a construction sufficient for moving the shoes into engagement with a split rim to expand it into a preselected interference fit position within a tire.

BRIEF DESCRIPTION OF THE DRAWINGS

FIG. 5 is a view like FIG. 4 with certain portions broken away for clarity, and showing the shoe assembly in a radially expanded position and the split rim in a preselected interference fit position within the tire.

FIG. 6 is a view like FIGS. 4 and 5 showing a subsequent step of assembly wherein a wheel mounting element is placed axially against the split rim, and a force application ring is connected to the actuator.

FIG. 7 is a view like FIG. 6 showing the wheel mounting element in place within the split rim.

FIG. 8 is a view somewhat comparable to FIG. 7, only showing the apparatus of the present invention in a disassembly mode of operation.

DESCRIPTION OF THE INVENTION

Figure 1:
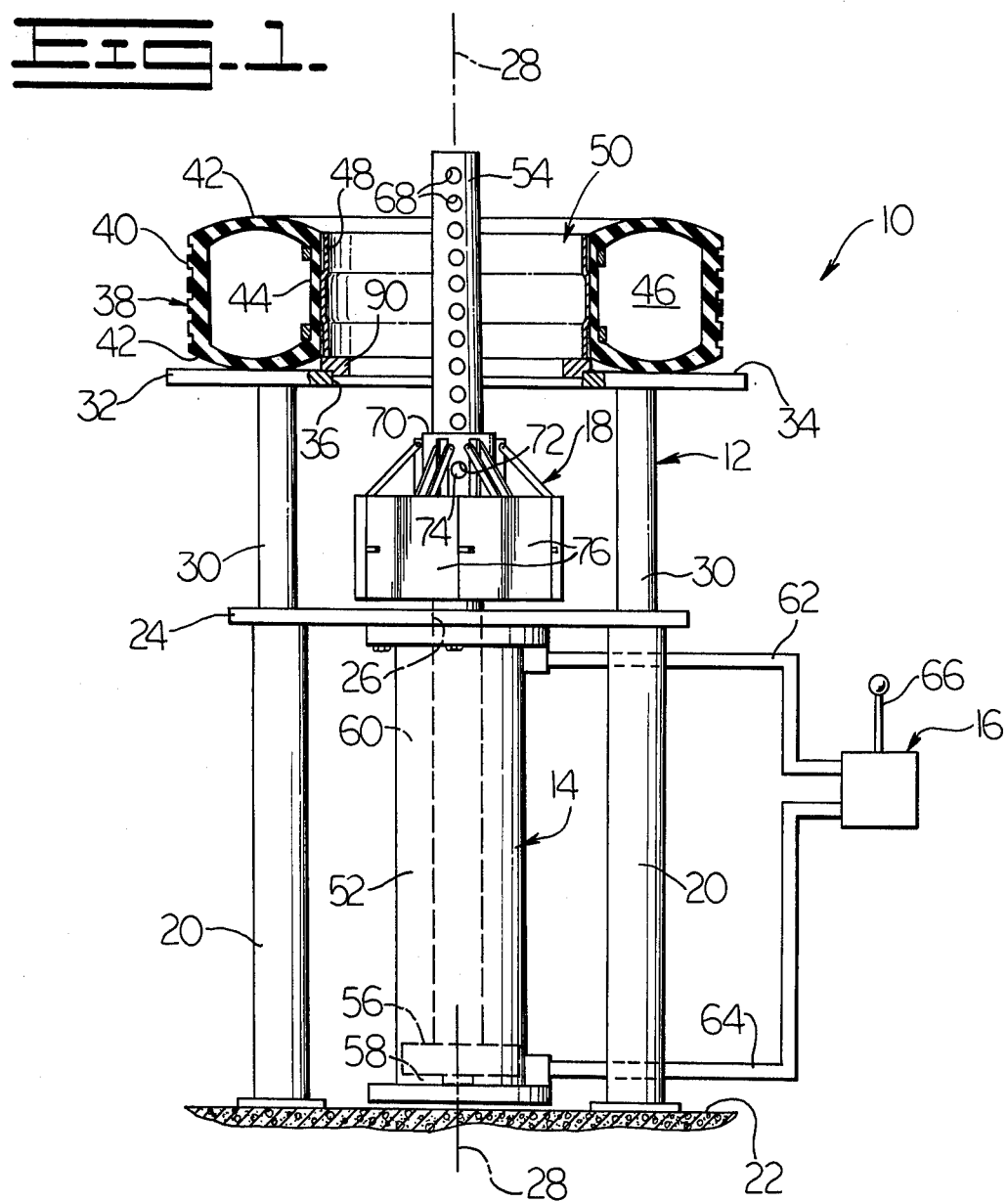
FIG. 1 is a diagrammatic elevational view of the tire and center support assembling apparatus of the present invention with a tire and portions thereof shown in section for illustrative convenience.

A tire and center support assembling apparatus 10 is shown in FIG. 1 as having a cylindrical table assembly or frame 12, a powered actuator or fluid-operated jack 14, a control system 16 for the actuator, and a shoe assembly 18.

The frame 12 includes a plurality of lower support columns 20 which rest on a floor 22, and a sturdy deck 24 mounted on the lower support columns and having a central aperture 26 therethrough which is concentrically disposed on a central upright axis 28 of the apparatus. The frame further includes a plurality of upper columns 30 which support an annular table top or plate 32 having an upper tire-supporting surface 34 and a central opening 36 therethrough which is also concentric with the axis. In this manner the upper surface of the frame supports an elastomeric tire 38 of the oval pneumatic type such as is disclosed in U.S. Pat. No. 3,606,921 issued Sept. 21, 1971 to C. E. Grawey.

Figure 2:
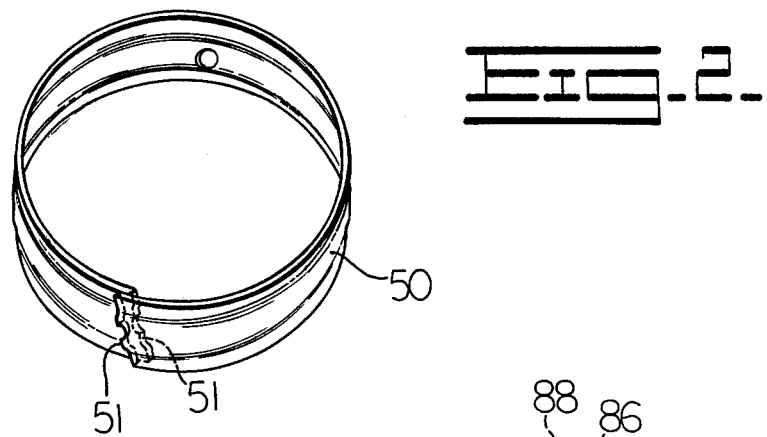
FIG. 2 is a perspective view of the split rim shown in FIG. 1 to better illustrate an overlapping condition of the ends thereof.

In general, the tire 38 has an outer peripheral tread portion 40, a pair of arcuately shaped sidewalls 42, and an inner peripheral base 44 to define an internal air chamber 46 within it. The base of the tire has a rim mounting surface 48 which is radially expandable to a relatively limited degree by the installation of a substantially transversely split tire supporting rim 50. As shown in FIG. 2, the rim has circumferentially relatively movable ends 51 which are disposable between a reduced diameter position for ease of insertion into the tire and an increased diameter position. Such a split rim may be of the type shown in U.S. Pat. No. 3,998,258, issued Dec. 21, 1976 to C. E. Grawey, et al, the disclosure of which is incorporated herein by reference as though set out at length herein.

Referring now to the powered actuator 14, it is apparent that it is basically a double-acting hydraulic jack of the usual type having a cylindrical housing 52 secured to the deck 24 and a movable element or rod 54. The rod is secured to a piston 56 reciprocably and sealingly mounted within the housing to divide it into a lower head end chamber 58 and an upper rod end chamber 60. A pair of conduits 62 and 64 lead from the control system 16 to these chambers, and by manually movement of a control lever or foot pedal 66 pressure fluid is selectively directed to one of the conduits and one of the chambers, while fluid from the other chamber is allowed to return to the control system via the other conduit. Thus, in a conventional manner the jack may be operated to extend the rod 54 upwardly along the axis 28 of the apparatus, or to retract it. Advantageously, the rod end of the jack has a plurality of openings 68 therethrough at substantially equally axially spaced apart distances for purposes which will be subsequently explained.

In accordance with one aspect of the invention, the shoe assembly 18 is connectable to the rod 54 of the jack 14 to be movable therewith. For this purpose the shoe assembly has a cylindrical sleeve 70 which is slidable along the rod. The sleeve has a pair of aligned openings 72 through the opposite sides thereof so that a retaining pin 74 may be installed therethrough and through an appropriate one of the openings 68 in the rod to lock the shoe assembly to the rod at any convenient point.

Figure 3:
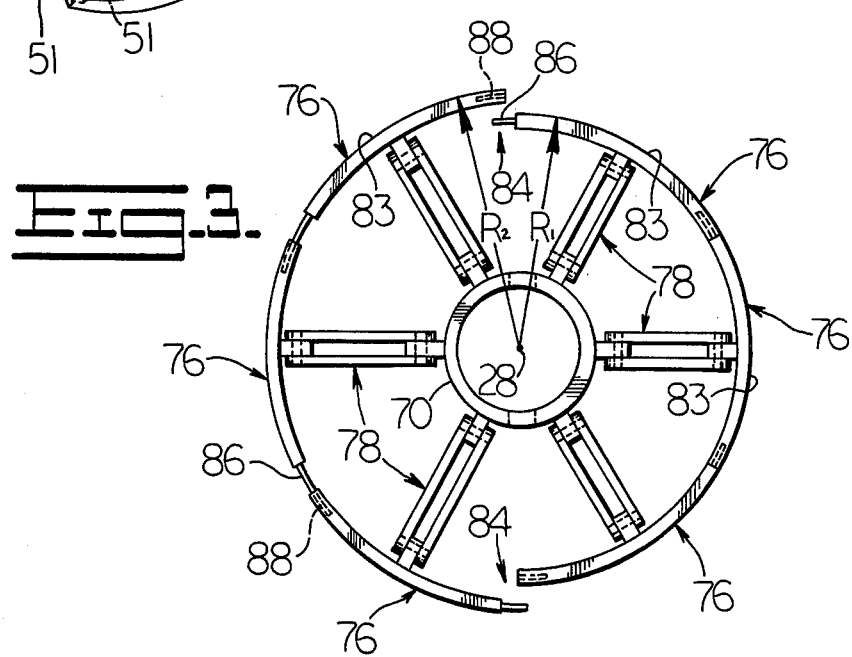
FIG. 3 is a diagrammatic plan view of the shoe assembly shown in FIG. 1 illustrating at the right side when viewing the drawing a fully retracted position of the shoes, and at the left side an expanded position of the shoes for simultaneous comparison.
Figure 4:
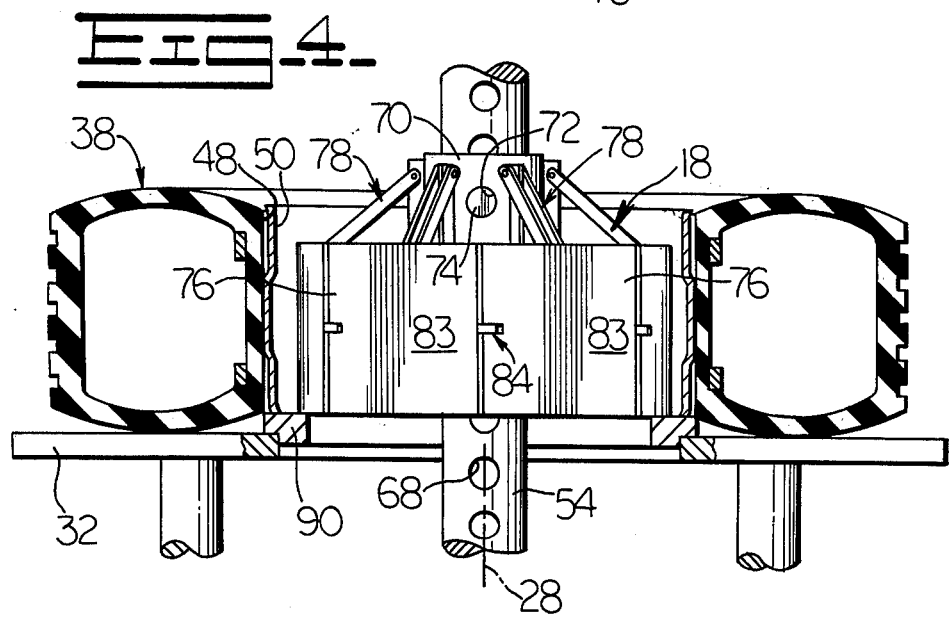
FIG. 4 is a fragmentary and enlarged view of a portion of the assembling apparatus of FIG. 1 illustrating a preliminary position of the shoe assembly prior to powered expansion thereof.

As shown also in FIGS. 3, 4 and 5 the shoe assembly 18 includes a plurality of arcuately shaped shoes 76, in the instant example six shoes, which are individually connected to the sleeve 70 by linkage means 78. Particularly, such linkage means is a parallelogram linkage arrangement having an upper pair of parallel links 80 and a lower pair of parallel links 82 pivotally connected between the sleeve and shoe as best shown in FIG. 5. In this way the shoes can be moved radially through a preselected degree of motion while maintaining an outer cylindrical surface portion 83 on each of the shoes in generally concentric and aligned relation to the central axis 28 of the assembling apparatus 10.

Pursuant to another aspect of the present invention, provision is made for simultaneously moving all of the shoes 76 in a coordinated manner by coupling means 84 disposed between them as best shown in FIG. 3. More specifically, the coupling means includes a pin 86 and a pin-receiving recess 88 on the circumferentially opposite edges of each of the shoes. Since the pin of each shoe is telescopically received in the recess of the adjacent shoe it is apparent that any swinging movement of one of the shoes will be transmitted to the other shoes as well. Moreover, the shoes can be moved from a fully retracted position as shown at the right side of FIG. 3 wherein the outer peripheral surface portions 83 form a cylinder of radius $R_1$, to an expanded position as shown at the left side when viewing the drawing wherein the surface portions are substantially disposed at a greater radius $R_2$ from the axis 28.

The assembling apparatus 10 also includes three ring members in addition to those described above, which are used at certain times during the assembly or disassembly of the split rim 50 and a wheel mounting element 89 axially positioned within the rim and the tire 38. These members are an installation ring 90 as shown in FIGS. 1 and 4 through 6, a force application ring 92 having a cylindrical bore 93 centrally thereof as shown in FIGS. 6, 7 and 8, and a disassembly ring 94 shown only in FIG. 8. The wheel mounting element 89 has a central cylindrical opening 95 therethrough and may be of the type shown in previously noted U.S. Pat. No. 3,998,258, the disclosure of which is also incorporated herein by reference as though set forth at length herein.

OPERATION

In operation, and as shown in FIG. 1, the installation ring 90 is seated on the top plate 32 overlappingly at the edge of the central opening 36 and in concentric relation to the axis 28. The tire 38 is thereafter deposited on the upper surface 34 of the table assembly 12, and the split rim 50 lowered within the tire with its opposite ends 51 overlapping as illustrated in FIG. 2 until its lower edge is supported by the installation ring. In this way the split rim is correctly positioned axially within the tire. The control system 16 is then actuated to power the jack 14 and extend the rod 54, whereupon the retracted shoe assembly 18 passes upwardly within the central opening 36 and the installation ring 90. It is to be appreciated that the shoe assembly can be secured to the rod at any convenient working position, since it is a simple matter to raise the sleeve 70 and to align the opening 72 with one of the openings 68, whereupon insertion of the retaining pin 74 quickly locks the components together.

One of the shoes 76, links 80 or links 82 is then lifted to radially expand all of the shoes as a result of the action of the coupling means 84 and the rod 54 lowered slightly so that the lower edges of the shoes rest on the installation ring 90, as best shown in FIG. 4. Since the linkage means 78 are inclined downwardly and outwardly, any further powered lowering of the rod by the operator of the control system 16 will continue to radially expand the shoes wedgingly into engagement with the split rim 50. As a result, lowering of the rod expands the rim into engagement with the surface 48 of the tire 38 as shown in FIG. 5 to a position wherein the opposite ends 51 of the rim are disposed in edgeward abutment corresponding to a preselected interference fit position within the tire.

Next, the control system 16 is manipulated to raise the rod 54 and to release the shoe assembly 18 from its wedging engagement with the rim 50. This allows the shoe assembly to collapse to its fully retracted position while permitting the split rim to remain in the edgeward abutment position. As best shown in FIG. 6, the shoe assembly is lowered through the installation ring 90 with subsequent retraction of the jack 14 since it is no longer needed for further assembling or disassembling the tire.

Subsequently, the cylindrical opening 95 of the wheel mounting element 89 is slidably lowered on the rod 54 so that a conical nose portion 96 thereof is headed downwardly. Thereupon the conical nose portion is guided into concentric contact with the split rim. Thereafter the bore 93 of the force application ring 92 is slidably lowered on the rod 54 where it is secured thereto by another retaining pin 74. Then the rod is powerably lowered by selective movement of the control system 16 bringing the force application ring into firm engagement with the wheel mounting element. Further lowering of the rod will cause the wheel mounting element to radially expand the split rim because of the conical nose portion of the wheel mounting element and because the generally cylindrical outside diameter thereof is slightly larger than the preselected interference fit position corresponding to the abutment of the opposite ends 51 of the split rim. Lowering of the rod and the force application ring 92 is continued until the wheel mounting element 89 reaches a predetermined axial position within the rim or until it contacts the installation ring 90, whereupon assembly of the tire 38 and its center support is complete.

Disassembly of the center support from within the tire is effectively accomplished by the assembly apparatus 10 in the following manner, as best appreciated with reference to FIG. 8. The table assembly 12 is initially prepared for the disassembly process by placing the disassembly ring 94 seatingly on the edge of the central opening 36. It is to be noted that the inside diameter of the disassembly ring is smaller than that of the installation ring 90 previously discussed. Specifically, the inside diameter of the disassembly ring is substantially the same as the inside diameter of the split rim 50 when in its preselected interference fit position. Accordingly, the tire 38, and the rim 50, and the wheel mounting element 89 are placed on the table assembly as a unit with the axially outside surface of the tire down, rather than the axially inside surface down as is the case with the assembly procedure. The tire is disposed in abutment with the upper surface 34 of the table assembly and the rim is in axial edgeward abutment with the disassembly ring.

Subsequently, the force application ring 92 is lowered on the rod 54 and the retaining pin 74 installed to secure them together. Thereafter the rod is lowered to press the ring 92 and wheel mounting element 89 downwardly through the disassembly ring 94 and the opening 36 in the table assembly 12. A screwdriver or equivalent tool can then be used to pry between the split rim 50 and the base 44 of the tire 38 to release the rim from the condition where its ends are in aligned abutment. Alternately, a tap with a mallet on either side of the ends 51 of the split rim will release the rim. It is thereafter a simple matter to lift the freed rim from within the tire.

Other aspects, objects, and advantages will become apparent from a study of the drawings, specification, and claims.

The embodiments of the invention in which an exclusive property or privilege is claimed are defined as follows:

1. A tire and center support assembling apparatus, for installing a split rim into a tire, comprising:
   a tire supporting frame having a central axis;
   a powered actuator connected to the frame and having a movable element; and
   shoe assembly means for expanding the rim into a preselected interference fit position within the tire in response to selective movement of the element of the actuator along the axis, the shoe assembly means having a plurality of similar shoes individually having a radially outer cylindrical surface portion and linkage means for radially moving and expanding each of the shoes in a plane perpendicular to the central axis into engagement with the rim while maintaining the outer cylindrical surface portions collectively in generally concentric and aligned relation with the central axis, the linkage means being connected to the movable element.

2. The apparatus of claim 1 including coupling means for substantially simultaneously moving all of the shoes relative to and independently of movement of the movable element of the actuator in response to manual movement of a single portion of the shoe assembly means.

3. The apparatus of claim 2 wherein said shoes have circumferentially opposite edges and said coupling means includes a plurality of pins and a plurality of recesses on the opposite edges, said pins being individually telescopically received in the respectively associated recess of the adjacent shoe.

4. The apparatus of claim 1 wherein said linkage means includes a linkage arrangement for each shoe, each of said linkage arrangements being of parallelogram configuration.

5. The apparatus of claim 1 wherein said frame includes a stationary table top with opening means therethrough concentric with the axis for permitting axial movement of the movable element and the shoe assembly means therethrough when said tire rests on said table top.

6. The apparatus of claim 5 including removable installation ring means seated on the table top and overlapping the edge of the opening means for axially positioning the split rim within the tire and engaged with the shoes during radial movement of the shoes.

7. A tire and center support assembling apparatus, for installing a split rim into a tire and a wheel mounting element into the split rim, comprising:
   a tire supporting frame having a central axis and a plate having an opening therethrough concentric with the axis;
   a double-acting fluid jack connected to said frame and having a movable rod end;
   a removable installation ring seated on the plate and overlapping the edge of said opening;
   shoe assembly means for expanding the rim into a preselected interference fit position within the tire in response to selective movement of the rod end of the jack along the axis, said shoe assembly means having a plurality of shoes each having a radially outer cylindrical surface portion and linkage means for radially moving and expanding each of said shoes against said installation ring into engagement with the rim while maintaining said outer cylindrical surface portions collectively in general concentric and aligned relation with the central axis; and
   force application ring means removably connected to the rod end of the jack for axially pressing the wheel mounting element into the split rim and radially expanding the split rim into the tire from said preselected interference fit position to an interference fit position greater than said interference fit position.

* * * * *